United States Patent
Huffman et al.

(10) Patent No.: US 8,825,616 B2
(45) Date of Patent: Sep. 2, 2014

(54) EXECUTION OF DATABASE QUERIES INCLUDING FILTERING

(75) Inventors: Paul C. Huffman, Sharon (CA); Kathy A. McKnight, Sharon (CA); David C. Sharpe, Toronto (CA); Daniel C. Zilio, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1552 days.

(21) Appl. No.: 11/780,777

(22) Filed: Jul. 20, 2007

(65) Prior Publication Data

US 2008/0256053 A1 Oct. 16, 2008

Related U.S. Application Data

(63) Continuation of application No. 10/910,119, filed on Aug. 3, 2004, now abandoned, and a continuation of application No. 09/757,428, filed on Jan. 10, 2001, now Pat. No. 6,879,977.

(30) Foreign Application Priority Data

Apr. 28, 2000 (CA) ..................................... 2307155

(51) Int. Cl.
  *G06F 17/30* (2006.01)
(52) U.S. Cl.
  CPC .... *G06F 17/30486* (2013.01); *G06F 17/30492* (2013.01); *Y10S 707/99935* (2013.01); *Y10S 707/99945* (2013.01); *Y10S 707/99932* (2013.01); *Y10S 707/99943* (2013.01); *Y10S 707/99933* (2013.01)

USPC ............. 707/704; 707/999.005; 707/999.104; 707/999.002; 707/999.102; 707/999.003

(58) Field of Classification Search
USPC .......................................................... 707/704
See application file for complete search history.

(56) References Cited

U.S. PATENT DOCUMENTS

| | | | |
|---|---|---|---|
| 5,504,873 A | 4/1996 | Martin et al. | |
| 5,506,984 A | 4/1996 | Miller | |
| 5,598,559 A | 1/1997 | Chaudhuri | |
| 5,706,457 A | 1/1998 | Dwyer et al. | |

(Continued)

FOREIGN PATENT DOCUMENTS

| | | |
|---|---|---|
| JP | 03108036 | 5/1991 |
| JP | 09231115 | 9/1997 |

(Continued)

OTHER PUBLICATIONS

Microsoft Computer Dictionary, Fifth Edition, (Published May 2002), [Retrieved on Aug. 31, 2010] Retrieved from the Internet: http://proquest.safaribooksonline.com/0735614954; pp. 1-2.*

*Primary Examiner* — Alex Gofman
(74) *Attorney, Agent, or Firm* — Sawyer Law Group, P.C.

(57) ABSTRACT

A query processing system has a query processor and a data manager. The query processor calls the data manager to carry out data access for a query including a filtering operation. The data manager accesses the data in a set of data and before returning the data, initiates a callback to the query processor to determine if the located data meets the filtering criteria. Where the data does not satisfy the filtering criteria, the data manager seeks additional data in the set of data, without having to return the first located data to the query processor.

33 Claims, 1 Drawing Sheet

(56) References Cited

U.S. PATENT DOCUMENTS

| | | |
|---|---|---|
| 5,724,570 A | 3/1998 | Zeller et al. |
| 5,758,149 A | 5/1998 | Bierma et al. |
| 5,758,356 A | 5/1998 | Hara et al. |
| 5,768,578 A | 6/1998 | Kirk et al. |
| 5,899,986 A | 5/1999 | Ziauddin |
| 5,937,401 A | 8/1999 | Hillegas |
| 5,950,188 A | 9/1999 | Wildermuth |
| 5,974,408 A * | 10/1999 | Cohen et al. ............ 707/2 |
| 5,987,463 A | 11/1999 | Draaijer et al. |
| 6,026,404 A | 2/2000 | Adunuthula et al. |
| 6,049,800 A | 4/2000 | Govindarajan et al. |
| 6,101,531 A | 8/2000 | Eggleston et al. |
| 6,192,370 B1 | 2/2001 | Primsch |
| 6,195,653 B1 | 2/2001 | Bleizeffer et al. |
| 6,223,171 B1 | 4/2001 | Chaudhuri et al. |
| 6,249,792 B1 | 6/2001 | Zwilling et al. |
| 6,360,228 B1 | 3/2002 | Sundara et al. |
| 6,363,387 B1 * | 3/2002 | Ponnekanti et al. ............ 707/10 |
| 6,411,951 B1 | 6/2002 | Galindo-Legaria et al. |
| 6,470,330 B1 | 10/2002 | Das et al. |

FOREIGN PATENT DOCUMENTS

| | | |
|---|---|---|
| JP | 10-040146 | 2/1998 |
| JP | 11025096 | 1/1999 |
| JP | 11328185 | 11/1999 |
| JP | 2000067084 | 3/2000 |
| JP | 2000076288 | 3/2000 |
| WO | 9704407 | 2/1997 |

* cited by examiner

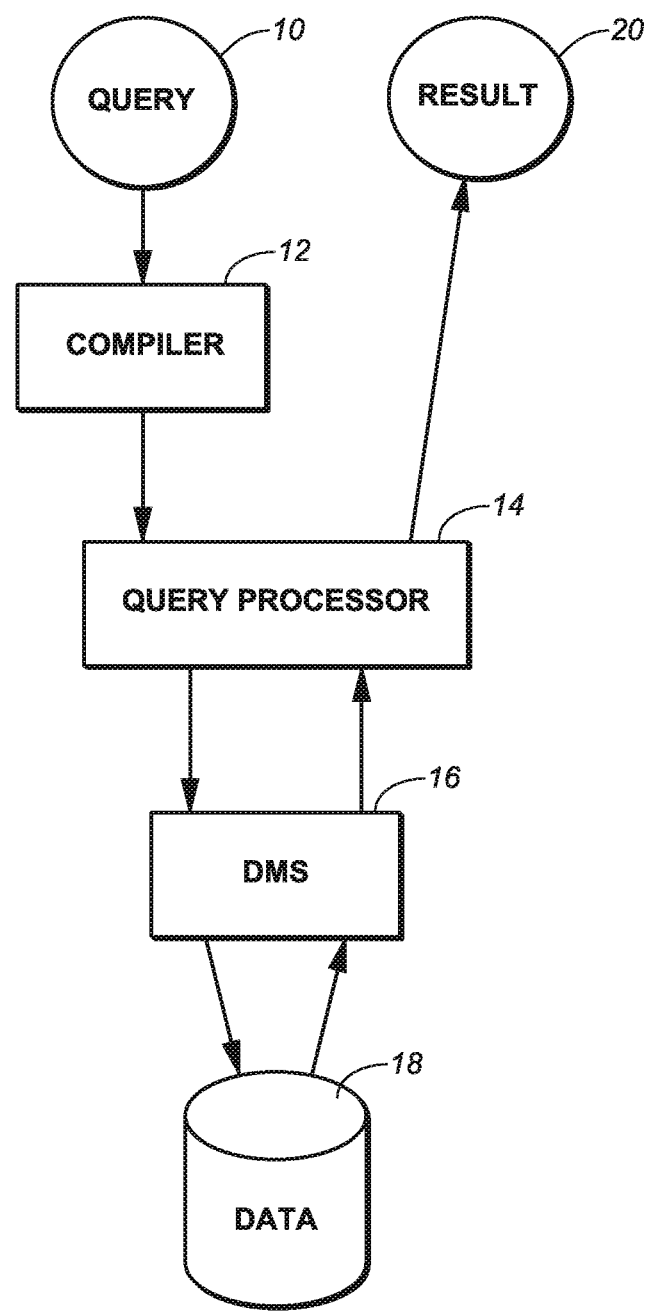

EXECUTION OF DATABASE QUERIES INCLUDING FILTERING

CROSS-REFERENCE TO RELATED APPLICATIONS

Under 35 USC §120, this application is a Continuation application and claims the benefit of priority to U.S. patent application Ser. No. 10/910,119, filed on Aug. 3, 2004 and U.S. patent application Ser. No., 09/757,428, filed Jan. 10, 2001, both of which claims the benefit of priority under 35 USC §119 to Canadian Application No. 2,307,155, filed Apr. 28, 2000, all of which is incorporated herein by reference.

FIELD OF THE INVENTION

The present invention is directed to an improvement in computing systems and in particular to improved database query execution where the query being executed includes filtering operations.

BACKGROUND OF THE INVENTION

In query processing systems, such as the relational database management system (RDBMS) DB2™, data values are extracted from stored images of the data for further processing by the query evaluation system. Typically, the data is structured as rows comprised of column values, said rows being grouped into contiguous storage blocks known as pages. A part of the task of query evaluation comprises the process of isolating successive rows and extracting a (possibly proper) subset of the columns of the row for subsequent query evaluation steps such as filtering, sorting, grouping, or joining.

Extracting column values from pages involves steps of identifying and locating in main memory the page containing the next needed row, locating the next needed row within the page, locating the needed column values within the needed row, and copying the needed column values to new locations in memory where they are made available for subsequent query evaluation steps. Typically, locating a page in memory requires determining whether the page is in main memory and, if so, determining where in memory the page is located. If the page is not in main memory, the page must be brought to main memory from secondary storage (typically from disk).

Additionally, in query evaluation systems supporting concurrent query executions, steps must be taken to stabilize the page to ensure that it remains at the same location in memory and to avoid concurrent read and updates to the page to preserve the logical integrity of the page contents. Subsequent to copying needed column data values to new locations, the page stabilization conditions must be released.

The steps of accessing data by locating a page, stabilizing the page, locating a row in the page, and releasing stabilization for each row to be processed by the query evaluation system can constitute a significant portion of the overall execution cost of a query.

Prior art query evaluation systems, such as RDBMSs, use different approaches to avoid repeatedly accessing rows in a page by following the potentially costly steps set out above. For example, where there are predicates in queries that are to be satisfied, it is possible to evaluate the predicates for located rows before retrieving the sets of column values of interest for the queries. Where a row does not meet the predicate condition, the next row (potentially on the same page in the data) may be accessed without requiring a renewed stabilization of the page. The existing location in the page is also known, which may reduce the cost of locating the next row.

This application of predicates to column values of a current row while the column values still lie with their row in the currently identified page is sometimes called search argument (or SARG) processing. This processing approach allows the system to continue to the next row on the same page without releasing page stabilization, re-identifying the location of the page in memory, and re-stabilizing the page whenever the SARG predicate(s) are not satisfied. Additionally, programmatic book keeping associated with transfer of control between page processing and query evaluation components of the query processing system can be avoided for rows which would soon be discarded subsequent to a predicate being evaluated using the copied column values.

Another prior art approach to reducing the need to restabilize the data page involves processing the needed columns of the current -row directly from its page in the data and continuing directly to the next row on the page. Typical processing operations which can "consume" column values directly from the page include sorting (enter column values into the sorting data structure) or aggregation (include column values in the running results for SUM, AVG, MAX, etc.). This type of processing is sometimes referred to as "consuming pushdown", because there is a 'pushdown' of a consuming operation into data access processing.

The above approaches, however, apply only where there is a predicate to be evaluated, or where there is a consuming operation carried out as part of the query execution. In query processing systems, such as RDBMSs, there are other types of queries that are potentially costly to execute and which are therefore not susceptible to the above approach. An example of such a query is a query having non-predicate and non-consuming operations but which filter data values.

It is therefore desirable to have a query processor which is able to execute a query including filtering in a manner that reduces the number of page stabilizations required to execute the query.

SUMMARY OF THE INVENTION

According to one aspect of the present invention, there is provided an improved execution of database queries including filtering operations. According to another aspect of the present invention, there is provided a method for processing a database query resulting in an access plan, including a filtering criteria, in a database management system comprising a data manager, a set of data, a query manager, the method comprising the steps of:

the query manager calling the data manager to access query-specified data in the set of data, the data manager performing a callback to the query manager the query manager indicating to the data manager, in response to the callback, whether the query-specified data satisfies the filtering criteria, the data manager returning the query-specified data based on the response from the query manager to the callback.

According to another aspect of the present invention, there is provided the above method in which the set of data is stored on pages and the method further comprising the step of the data manager stabilizing the page on which the query-specified data is located prior to access said data, the method further comprising the step of maintaining the stabilization of the page during callback to the query manager.

According to another aspect of the present invention, there is provided the above method in which the database query comprises an SQL DISTINCT clause.

According to another aspect of the present invention, there is provided a program storage device readable by a machine, tangibly embodying a program of instructions executable by the machine to perform method steps for processing queries for a database, said method steps comprising the method steps of claim 1, 2 or 3.

According to another aspect of the present invention, there is provided a computer program product for a database management system comprising a data manager, a set of data, and a query manager for processing a database query resulting in an access plan, including a filtering criteria, the computer program product comprising a computer usable medium having computer readable code means embodied in said medium, comprising:

computer readable program code means for the query manager to call the data manager to access query-specified data in the set of data, computer readable program code means for the data manager to perform a callback to the query manager, computer readable program code means for the query manager to indicate to the data manager, in response to the callback, whether the query-specified data satisfies the filtering criteria, computer readable program code means for the data manager to return the query-specified data based on the response from the query manager to the callback.

According to another aspect of the present invention, there is provided the above computer program product in which the set of data is stored on pages and in which the computer usable medium having computer readable code means embodied in said medium, further comprises:

computer readable program code means for the data manager to stabilize the page on which the query-specified data is located prior to accessing said data, and computer readable program code means for maintaining the stabilization of the page during callback to the query manager.

According to another aspect of the present invention, there is provided a query processing system comprising a data manager, a set of data, and a query manager for processing a database query resulting in an access plan, including a filtering criteria, the query manager comprising means for calling the data manager to access query specified data in the set of data, the data manager comprising means for performing a callback to the query manager the query manager comprising means for indicating to the data manager, in response to the callback, whether the query-specified data satisfies the filtering criteria, and the data manager comprising means for returning the query-specified data based on the response from the query manager to the callback.

According to another aspect of the present invention, there is provided the above query processing system, in which the set of data is stored on pages and data manager further comprises means for stabilizing the page on which the query-specified data is located prior to access said data, and means for maintaining the stabilization of the page during callback to the query manager.

According to another aspect of the present invention, there is provided a query processing system comprising a data manager for accessing data records located in pages in a set of stored data, the data manager stabilizing a page on which a data record is stored before accessing the record, the query processing system also comprising:

a query processor for processing a data access plan, the query processor calling the data manager and the query processing system indicating to the data manager where a query being processed includes a designated filtering operator, where the data manager receives the indication of a designated filtering operator, the data manager stabilizing a current data page containing the next located record in the set of stored data, the data manager applying the designated filtering operator to a next located record before releasing the stabilization of the current data page, the data manager locating a further set of records in the stabilized current data page to locate a one of the records matching the designated filtering operator.

According to another aspect of the present invention, there is provided the above query processing system, in which the data manager applies the designated filtering operator to the next located record by calling the query processor to carry out the filtering operation.

Advantages of the present invention include improved efficiency for the execution of database queries that include filtering operations.

BRIEF DESCRIPTION OF THE DRAWING

The preferred embodiment of the invention is shown in the drawing, wherein:

FIG. 1 is a flow chart illustrating the steps in query interpretation using the preferred embodiment of the invention.

In the drawing, the preferred embodiment of the invention is illustrated by way of example. It is to be expressly understood that the description and drawing are only for the purpose of illustration and as an aid to understanding, and are not intended as a definition of the limits of the invention.

DETAILED DESCRIPTION

FIG. 1 is a flow chart diagram illustrating steps in executing a query in accordance with the preferred embodiment of the invention. Query 10 represents a query to be executed to access data in a database. Compiler 12 compiles query 10 and generates an access plan for the query. Query processor 14 receives the access plan from compiler 12. As required, query processor 14 calls data management system (DMS or data manager) 16 to obtain access to data 18. In the preferred embodiment, records or rows of data are stored on pages in data 18. Data management system 16 retrieves column values from data 18 and returns the values to query processor 14. Processing is carried out by query processor 14 in accordance with the access plan created by compiler 12 and data is returned as result 20 which corresponds to query 10 as applied to data 18.

In query processing systems that support concurrent access to data, the location and stabilization of a page containing data is a potentially expensive operation. Each time that data management system 16 stabilizes a page in data 18, and locates (using a notional cursor) in the preferred embodiment) a position in the page in data 18, there will be a resulting time cost added to the processing of the query.

Where a query includes a filtering operation, such as that carried out by the DISTINCT operator found in SQL, there may be significant calls from data management system 16 to data 18 to retrieve rows for filtering by query processor 14. As explained above, repeated accessing of data 18 where pages are stabilized and then released on each access, incorporates potentially avoidable inefficiencies in the query processing.

In the system of the preferred embodiment, non-predicate filter processing may be carried out without the data management system 16 releasing the stabilization of the page in data 18 which is being read from. It is therefore possible to carry out non-predicate filtering directly on column values of a current row while the column values are "in place" in the stabilized and located row in the currently identified page.

The approach of the preferred embodiment is described with reference to the following Program Description Language (PDL) of processing a query including the keyword DISTINCT. The example is presented as showing execution first without and then with, the execution steps of the preferred embodiment. The example uses the following query on table "employee" have column "name":

SELECT DISTINCT name FROM employee;

In the following PDL fragments, query_processor corresponds to query processor 14, and data_manager corresponds to data management system 16 as shown for the RDBMS of FIG. 1. In the RDBMS query execution without the steps of the preferred embodiment, the access plan for the above query results in the following execution:

1. data_manager stabilizes the page containing the next record (row) in the employee table;
2. data-manager copies the name column from the row located by data_manager to query_processor buffers (buffer thisRec)
3. data-manager releases the page position of the page containing the returned record (unfix/unlatch)
4. query_processor applies any further processing, in this case the FILTER:
   if no records seen yet, initialize oldRec, a query_processor buffer for one record: oldRec=thisRec
   else if oldRec!=thisRec, then this is a distinct record, allow the data to flow (back to the user)
   else (oldRec==thisRec), this is a nonDistinct record, do not allow the data to flow
   query_processor loop back to first step, drive data-manager to get the next record In the above approach, the DISTINCT filtering operation is done after the page is released and each row is produced by data_manager to query_processor.

The query processing of the example query using the approach of the preferred embodiment results in the following access plan being implemented:

1. data-manager positions the cursor (fix/latch) on a row location in a page in the data;
2. data-manager calls back to query_processor to filter the row (without releasing the fix/latch on the row location in the page in data):
   if no records seen yet, initialize oldRec, a query_processor buffer for one record: oldRec=thisRec (where thisRec is the data_manager buffer), return to data_manager that the record qualifies
   else if oldRec!=thisRec, then this is a distinct record, return to data_manager that the record qualifies
   else (oldRec==thisRec), then this is a nonDistinct record, return to data_manager that the record does not qualify
3. if the record qualifies (it is determined to be distinct), then data_manager copies the name column from data-manager to query_processor buffers and data_manager releases the row position in the page in data (unfix/unlatch), proceed to step 4;
else data_manager positions the cursor to the next row on the page and loop to step 2, above
4. query_processor applies any further processing to the query_processor buffers
5. query_processor loop back to drive data-manager to get the next record.

The above description for the simple SQL query including filtering (by the DISTINCT keyword) illustrates the improvement of the preferred embodiment. The data manager is able to keep the data page stabilized over multiple rows where the filtering specified by the DISTINCT keyword results in rows being skipped in the processing of the query.

The preferred embodiment provides better query processing performance in comparison with processing that requires repeated calls to data manager 16, in FIG. 1. This is because, in a manner similar to SARG and consuming pushdown (referred to above), filtering the record allows the system to continue to the next row on the same page without releasing page stabilization, re-identifying the location of the page in memory, and restabilizing the page whenever the filtering operations are not satisfied. Additionally, programmatic bookkeeping associated with transfer of control between page processing and query evaluation components of the query processing system can be avoided for rows which would soon be discarded subsequent to a predicate being evaluated using the copied column values.

A further basis for increased query processing performance with the preferred embodiment system is related to the current state of the art in the architecture of central processing units (CPUs) on which the preferred embodiment will be implemented. In such CPUs, resource utilization is increased by spatial and temporal locality of reference. When a CPU references data and/or instructions that are near to other data or instructions, both in time and space, then the CPU is able achieve improved performance. A fast (but relatively small) cache is found near or on the CPU in many current CPUs. This cache is intended to be filled when new data or instruction locations are referenced. Subsequent references to the same data or instructions, or to proximate data or instructions that were loaded in the cache as part of the caching method, are retrieved from the (fast) cache. Where the CPU carries out access in this manner using the cache, the CPU is able to process data and instructions more quickly than where there is access to instructions or data not resident in the cache.

The preferred embodiment system permits a looping process to be carried out over the rows contained in a page. This looping process improves utilization of CPUs by increasing the spatial and temporal locality of both instruction and data references and, thus, makes more effective use of instructions and data lodged in the processor memory caches.

The processing of queries using the preferred embodiment system can occur in conjunction with other pushdown approaches to query evaluation such as SARG, consuming and other filtering pushdowns. The filtering pushdown of the preferred embodiment does not preclude the data in a row located by data manager 16 and identified as being one of the rows successfully passing the defined filter also being subject to other predicate evaluation or consuming operations before being potentially returned to query processor 14.

It will also be apparent from this description that the filtering that is subject to the system of the preferred embodiment may be carried out where an SQL query (query 10 in FIG. 1) does not explicitly contain a filtering operator (such as DISTINCT) but where compiler 12 generates an access plan that includes a filtering operator as a logically equivalent query to the query as originally written. For example, optimizer 12 may use DISTINCT in the access plan for the following query:

SELECT name FROM employee GROUP BY name;

The rewritten query is the example set out above. The query is logically equivalent but will be able to make use of the approach of the preferred embodiment if rewritten including an express filtering operator (DISTINCT, in this case).

Although a preferred embodiment of the present invention has been described here in detail, it will be appreciated by those skilled in the art, that variations may be made thereto. Such variations may be made without departing from the spirit of the invention or the scope of the appended claims.

What is claimed is:

1. A method comprising:
stabilizing a page of data that includes a record to be accessed in accordance with an access plan generated for executing a query, the query comprising a non-predicate filtering operation;
positioning a cursor on the record to be accessed;
applying the non-predicate filtering operation of the query to the record to determine whether the record is to be filtered under the non-predicate filtering operation while the page of data remains stabilized; and
in response to a determination that the record is to be filtered under the non-predicate filtering operation,
repositioning the cursor on a next record included in the page of data that is to be accessed in accordance with the access plan generated for executing the query without releasing stabilization of the page of data, and
applying the non-predicate filtering operation of the query to the next record to determine whether the next record is to be filtered under the non-predicate filtering operation while the page of data remains stabilized.

2. The method of claim 1, further comprising:
in response to a determination that the record is not to be filtered under the non-predicate filtering operation,
copying the record to a storage location for further processing in accordance with the access plan, and
releasing stabilization of the page of data.

3. The method of claim 2, further comprising:
further processing the copy of the record in the storage location in accordance with the access plan; and
returning a result for the query.

4. The method of claim 2, wherein the storage location is a processor buffer.

5. The method of claim 2, wherein the storage location is a location in memory.

6. The method of claim 1, wherein the non-predicate filtering operation is a DISTINCT operation.

7. A non-transitory computer readable storage medium encoded with a computer program, the computer program comprising computer-executable instructions for:
stabilizing a page of data that includes a record to be accessed in accordance with an access plan generated for executing a query, the query comprising a non-predicate filtering operation;
positioning a cursor on the record to be accessed;
applying the non-predicate filtering operation of the query to the record to determine whether the record is to be filtered under the non-predicate filtering operation while the page of data remains stabilized; and
in response to a determination that the record is to be filtered under the non-predicate filtering operation,
repositioning the cursor on a next record included in the page of data that is to be accessed in accordance with the access plan generated for executing the query without releasing stabilization of the page of data, and
applying the non-predicate filtering operation of the query to the next record to determine whether the next record is to be filtered under the non-predicate filtering operation while the page of data remains stabilized.

8. The non-transitory computer readable storage medium of claim 7, wherein the computer program further comprises computer-executable instructions for:
in response to a determination that the record is not to be filtered under the non-predicate filtering operation,
copying the record to a storage location for further processing in accordance with the access plan, and
releasing stabilization of the page of data.

9. The non-transitory computer readable storage medium of claim 8, wherein the computer program further comprises computer-executable instructions for:
further processing the copy of the record in the storage location in accordance with the access plan; and
returning a result for the query.

10. The non-transitory computer readable storage medium of claim 8, wherein the storage location is a processor buffer.

11. The non-transitory computer readable storage medium of claim 8, wherein the storage location is a location in memory.

12. The non-transitory computer readable storage medium of claim 7, wherein the non-predicate filtering operation is a DISTINCT operation.

13. A system comprising:
a data manager, the data manager
stabilizing a page of data that includes a record to be accessed in accordance with an access plan generated for executing a query, the query comprising a non-predicate filtering operation, and
positioning a cursor on the record to be accessed; and
a query manager in communication with the data manager,
the query manager applying the non-predicate filtering operation of the query to the record to determine whether the record is qualifies under the non-predicate filtering operation while the page of data remains stabilized, and
indicating to the data manager that the record is to be filtered responsive to a determination that the record does not qualify under the non-predicate filtering operation,
in response to receiving the indication from the query manager that the record is to be filtered, the data manager
repositions the cursor on a next record included in the page of data that is to be accessed in accordance with the access plan generated for executing the query without releasing stabilization of the page of data, and
calls the query manager to apply the non-predicate filtering operation of the query to the next record without releasing stabilization of the page of data.

14. The system of claim 13, wherein the query manager indicates to the data manager that the record is not to be filtered responsive to a determination that the record qualifies under the non-predicate filtering operation,
in response to receiving the indication from the query manager that the record is not to be filtered, the data manager
copies the record to a storage location for further processing in accordance with the access plan, and
releases stabilization of the page of data.

15. The system of claim 14, wherein the query manager further
processes the copy of the record in the storage location in accordance with the access plan, and
returns a result for the query.

16. The system of claim 14, wherein the storage location is a processor buffer.

17. The system of claim 14, wherein the storage location is a location in memory.

18. The system of claim 13, wherein the non-predicate filtering operation is a DISTINCT operation.

19. A query processing system comprising:
a compiler generating an access plan for executing a query, the query comprising a designated filtering operation, the designated filtering operation being a non-predicate filtering operation;
a data manager managing access to records located in pages of stored data; and
a query processor in communication with the compiler and the data manager, the query processor
receiving the access plan for executing the query from the compiler, and
indicating to the data manager that the query comprises the designated filtering operation,
in response to receiving the indication from the query processor that the query comprises the designated filtering operation, the data manager
stabilizes a page of data containing a record to be accessed in accordance with the access plan generated for executing the query,
positions a cursor on the record to be accessed contained in the page of data, and
calls the query processor to apply the designated filtering operation of the query to the record without releasing stabilization of the page of data,
in response to receiving the call from the data manager to apply the designated filtering operation, the query processor
applies the designated filtering operation of the query to the record contained in the page of data to determine whether the record qualifies under the designated filtering operation while the page of data remains stabilized,
indicates to the data manager that the record is not to be filtered in response to a determination that the record qualifies under the designated filtering operation, and
indicates to the data manager that the record is to be filtered in response to a determination that the record does not qualify under the designated filtering operation,
in response to receiving the indication from the query processor that the record is not to be filtered, the data manager
copies the record to a storage location for further processing in accordance with the access plan, and
releases stabilization of the page of data,
in response to receiving the indication from the query processor that the record is to be filtered, the data manager
repositions the cursor on a next record to be accessed contained in the page of data without releasing stabilization of the page of data, and
calls the query processor to apply the designated filtering operation of the query to the next record without releasing stabilization of the page of data.

20. The query processing system of claim 19, wherein the query processor further processes the copy of the record in the storage location in accordance with the access plan, and returns a result for the query.

21. The query processing system of claim 19, wherein the designated filtering operation is a DISTINCT operation.

22. The query processing system of claim 19, wherein the storage location is a buffer of the query processor.

23. The query processing system of claim 19, wherein the storage location IS a location in memory.

24. A method comprising:
generating an access plan for executing a query, the query comprising a designated filtering operation, the designated filtering operation being a non-predicate filtering operation;
stabilizing a page of data containing a record to be accessed in accordance with the access plan generated for executing the query;
positioning a cursor on the record to be accessed contained in the page of data;
applying the designated filtering operation of the query to the record contained in the page of data to determine whether the record qualifies under the designated filtering operation while the page of data remains stabilized;
in response to a determination that the record qualifies under the designated filtering operation,
copying the record to a storage location for further processing in accordance with the access plan, and
releasing stabilization of the page of data; and
in response to a determination that the record does not qualify under the designated filtering operation,
repositioning the cursor on a next record to be accessed contained in the page of data without releasing stabilization of the page of data, and
applying the designated filtering operation of the query to the next record contained in the page of data while the page of data remains stabilized.

25. The method of claim 24, further comprising:
further processing the copy of the record in the storage location in accordance with the access plan; and
returning a result for the query.

26. The method of claim 24, wherein the designated filtering operation IS a DISTINCT operation.

27. The method of claim 24, wherein the storage location is a processor buffer.

28. The method of claim 24, wherein the storage location is a location in memory.

29. A non-transitory computer readable storage medium encoded with a computer program, the computer program comprising computer-executable instructions for:
generating an access plan for executing a query, the query comprising a designated filtering operation, the designated filtering operation being a non-predicate filtering operation;
stabilizing a page of data containing a record to be accessed in accordance with the access plan generated for executing the query;
positioning a cursor on the record to be accessed contained in the page of data;
applying the designated filtering operation of the query to the record contained in the page of data to determine whether the record qualifies under the designated filtering operation while the page of data remains stabilized;
in response to a determination that the record qualifies under the designated filtering operation,
copying the record to a storage location for further processing in accordance with the access plan, and
releasing stabilization of the page of data; and
in response to a determination that the record does not qualify under the designated filtering operation,
repositioning the cursor on a next record to be accessed contained in the page of data without releasing stabilization of the page of data, and applying the designated filtering operation of the query to the next record contained in the page of data while the page of data remains stabilized.

30. The non-transitory computer readable storage medium of claim 29, wherein the computer program further comprises computer-executable instructions for:
  further processing the copy of the record in the storage location in accordance with the access plan; and
  returning a result for the query.

31. The non-transitory computer readable storage medium of claim 29, wherein the designated filtering operation is a DISTINCT operation.

32. The non-transitory computer readable storage medium of claim 29, wherein the storage location is a processor buffer.

33. The non-transitory computer readable storage medium of claim 29, wherein the storage location is a location in memory.

* * * * *